Nov. 8, 1955     H. B. ALBERS     2,722,905
HYDRAULIC MACHINES

Filed May 7, 1951     5 Sheets-Sheet 1

INVENTOR.
HEINRICH B. ALBERS
BY Pollard and Johnston
ATTORNEYS

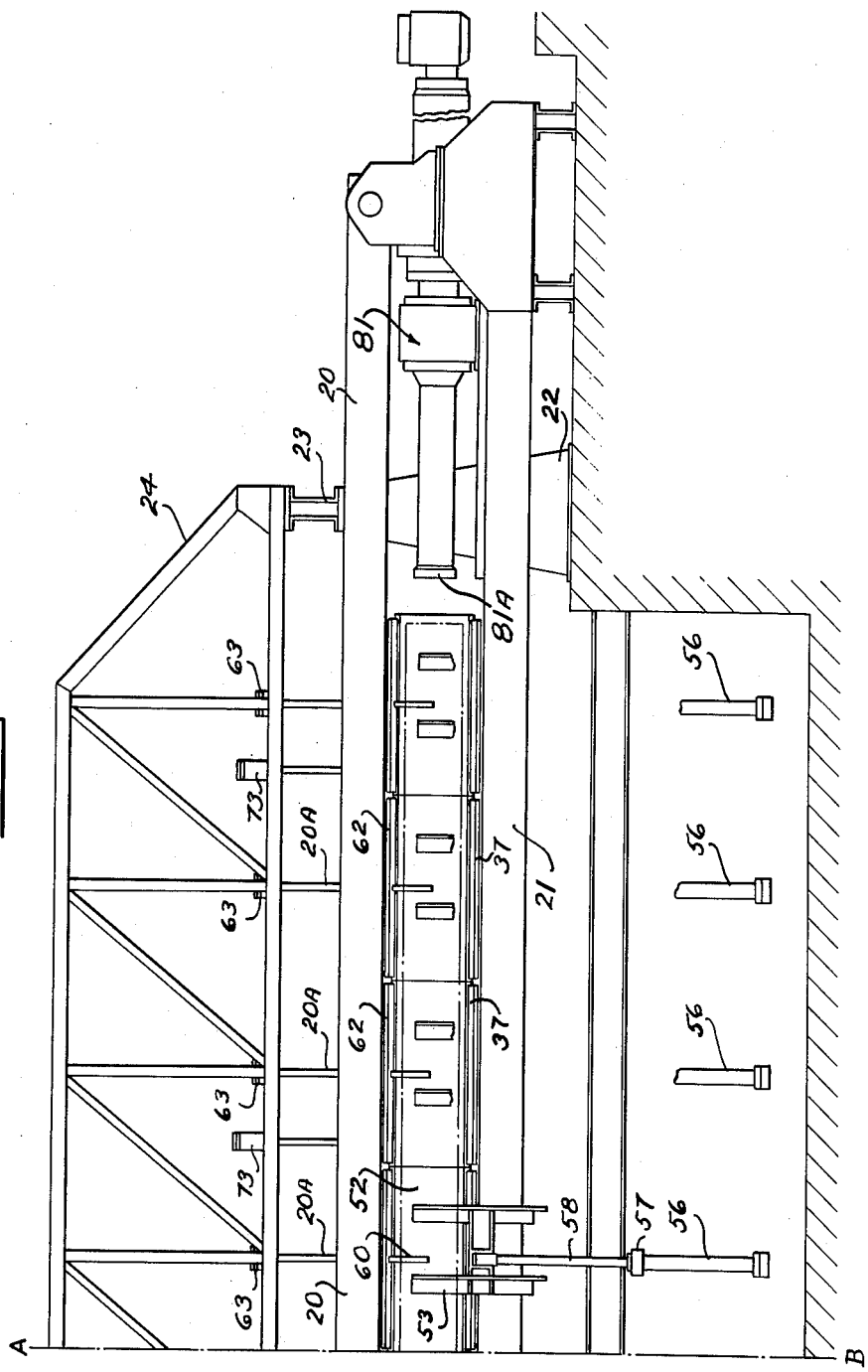

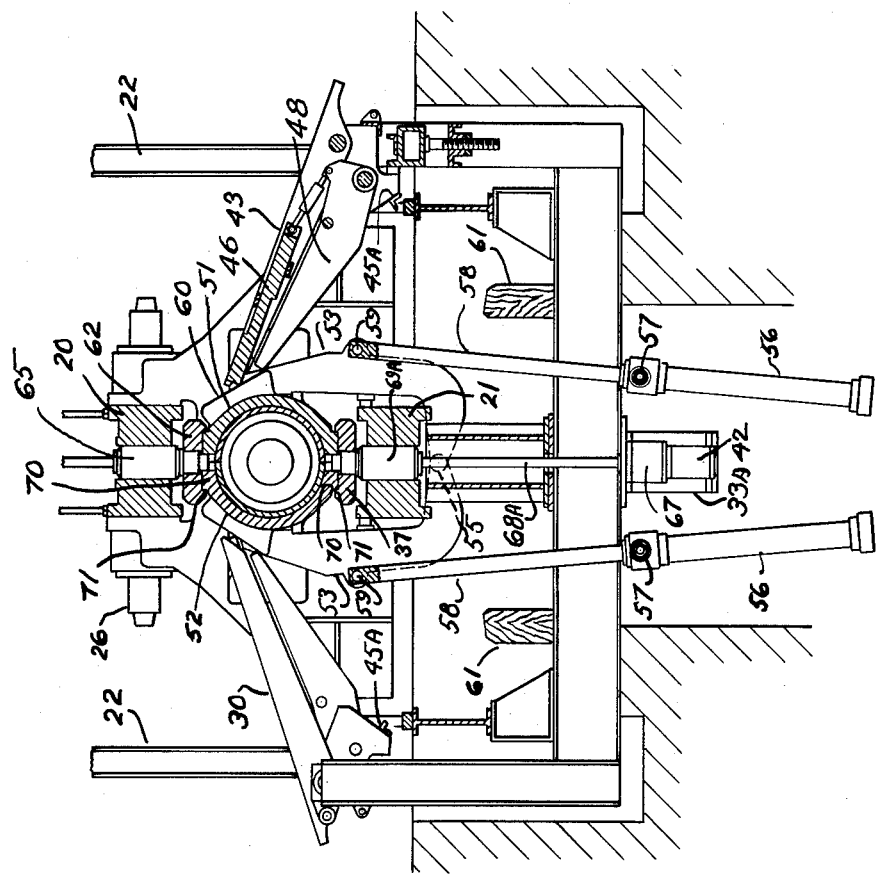

Nov. 8, 1955
H. B. ALBERS
2,722,905
HYDRAULIC MACHINES
Filed May 7, 1951
5 Sheets—Sheet 4
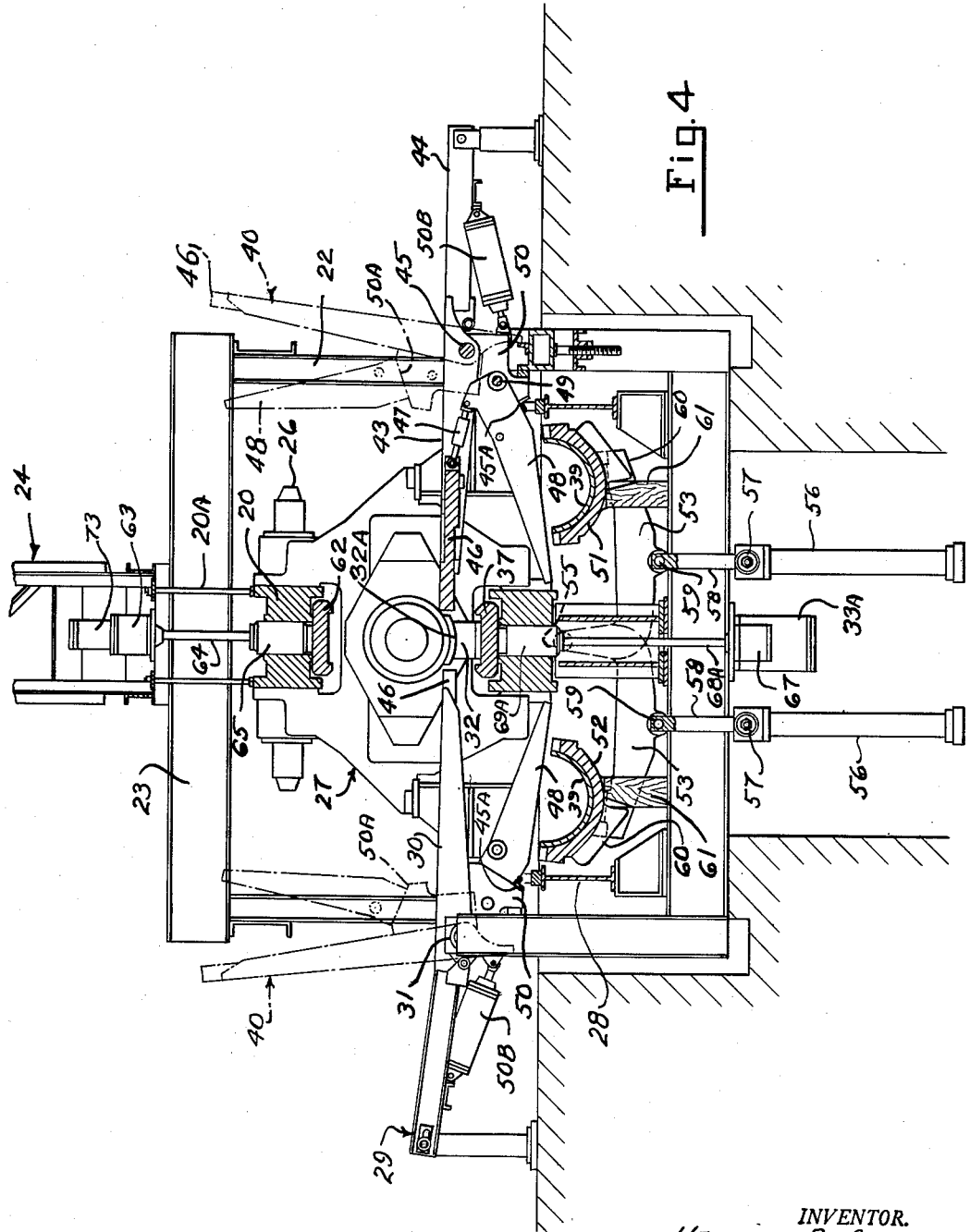
INVENTOR.
HEINRICH B. ALBERS
BY
Pollard and Johnston
ATTORNEYS Nov. 8, 1955　　　　H. B. ALBERS　　　　2,722,905
HYDRAULIC MACHINES
Filed May 7, 1951　　　　　　　　　　　　5 Sheets-Sheet 5
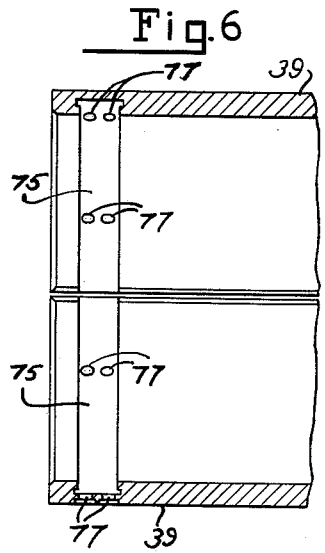
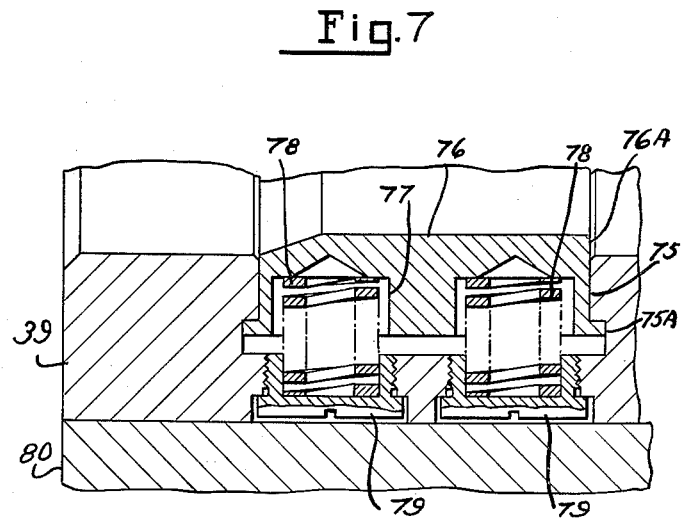
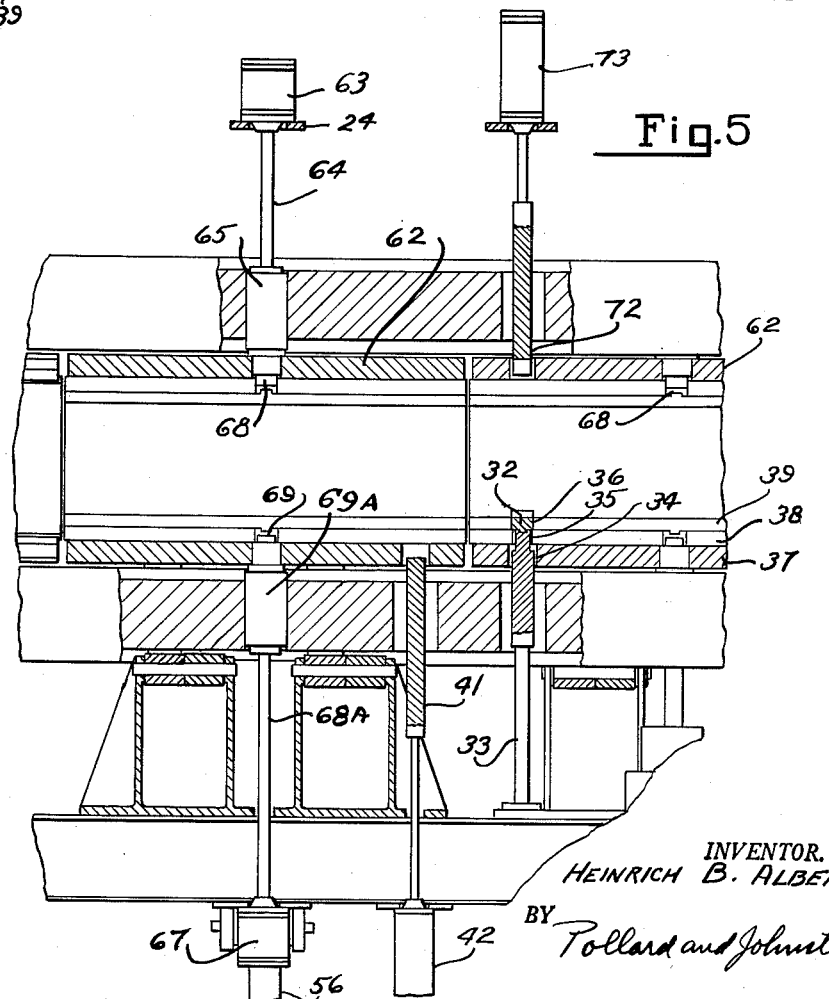
INVENTOR.
HEINRICH B. ALBERS
BY Pollard and Johnston
ATTORNEYS

United States Patent Office 2,722,905
Patented Nov. 8, 1955

2,722,905

HYDRAULIC MACHINES

Heinrich B. Albers, Malverne, N. Y., assignor to Hydropress, Incorporated, New York, N. Y., a corporation of Delaware Application May 7, 1951, Serial No. 224,902

3 Claims. (Cl. 113—44)

This invention relates to machines adapted for operation on tubes or pipes and particularly to a machine for expanding pipes, or a machine for belling, expanding, and/or testing the same.

In the manufacture of steel pipes and the like, it has been found desirable to subject the same to a cold working. This can be accomplished by expanding the tubes by means of hydraulic pressure against an outer shell, envelope, or mantle assembly. In operating on the pipe, it may be desirable to first expand or bell the ends and then to expand the entire pipe. After expansion, it often is desirable to test the pipe under hydraulic pressure. In many instances in the past, separate machines have been employed for these operations.

Pipes are made of varying lengths, so that it is desirable to be able to process any of these pipes on a single machine without undue complication. Pipes, of the size to which this invention especially is adapted, frequently are such as to require special arrangements for handling.

One of the objects of the invention is to provide an improved pipe expanding machine wherein pipes of varying lengths can be belled, expanded, and/or tested as desired.

Another of the objects of the invention is to provide an improved mantle means for enveloping the pipe in a pipe expanding machine.

A still further object is to facilitate handling of pipe in a hydraulic machine, especially when the pipe varies in length.

In one aspect of the invention, the machine may have a stationary housing at one end thereof with a hydraulic sealing mechanism, head, or tool advanceable into sealing relationship with the pipe by a hydraulic motor arrangement. This end of the machine may contain various valve arrangements for subjecting the interior of the pipe to hydraulic pressure and for releasing the same after the pipe has been expanded.

At the other end of the machine, there may be a movable housing arrangement which can be advanced along the machine according to the length of pipe involved. The movable housing may carry a sealing mechanism, head, or tool thereon adapted to move into sealing relationship with the pipe. A plurality of mantle assemblies or shells designed to surround the pipe and openable relative thereto can be located along the machine, these being selectively usable according to the length of pipe involved.

The tube to be operated upon first is moved to a loading mechanism from where it is moved to suitable supports in line with the sealing heads and the sealing heads moved into sealing relationship with the pipe. An appropriate number of mantle assemblies are selected to be used in accordance with the length of pipe being tested and these are closed around the pipe, the supports entering appropriate apertures in the mantle assemblies. The mantle assemblies preferably comprise two symmetrical openable and closable halves split in a manner so that when closed, the top longitudinally extending juxtapositioned edges and the lower longitudinally extending juxtapositioned edges will be approximately in the same vertical plane, although the edges can be otherwise arranged relative to each other. A mantle lock arrangement then is operated to grip the two halves or elements at both juxtapositioned edge zones in a manner so that the clamping force is directed substantially tangential to the periphery or circumference, or adjacent thereto, of the closed mantle shells. This will serve to reduce the forces involved in the locking mechanism, in the mantles, and in the elements for moving the mantle halves into and out of closed position.

After the pipe has been expanded, suitable clamping means may be activated to hold the pipe on the supports while the mantle halves are opened and while hydraulic test pressure is exerted on the interior of the pipe.

Thereafter, the clamps and sealing heads can be retracted and suitable ejector means can be moved upwardly to remove the pipe from its position in alignment with said sealing heads and to deliver the pipe to the unloading mechanism. The various clamping and holding supports can be located in suitable openings in the mantle assemblies and can be arranged to form part of the active surface thereof against which the pipe can be expanded.

The mantle halves may have suitable inserts defining a bore, which is the outside diameter of the expanded pipe, when the inserts are in closed relationship. The inserts are removably held in the mantle halves so as to facilitate changing thereof according to the pipe involved. Strippers can be placed in grooves in the inserts so as to longitudinally hold a pipe end as the sealing heads are withdrawn from the pipe. Preferably, the strippers are spring pressed inwardly to active position toward the center line of the pipe or sealing heads and all of the inserts can be furnished therewith, the springs permitting the pipe to press the strippers opposite the pipe itself into inactive positions in their grooves as the pipe expands. The outermost stripper will remain in an active position because it is not contacted by the expanded pipe.

These and other advantages, features and objects of the invention will become apparent from the following description and drawings.

In the drawings:

Figure 1 is a side elevation of the movable or adjustable end of the machine, parts of the machine, such as the loading arms, being omitted, as well as all but a few of the mantle operating rods.

Figure 2 is a side elevation of the right or stationary end of the machine, this end having the filling and assembly mechanisms, the elevation extending to the right of line A—B of Figure 1.

Figure 3 is a fragmentary sectional view taken approximately along the line 3—3 of Figure 1, the mantles being in closed position.

Figure 4 is similar to Figure 3 with the exception that the mantles are shown in open position.

Figure 5 is a fragmentary enlarged elevation of the closed mantles near the center of the machine taken in a direction from the right of Figs. 3 and 4, the strippers being omitted.

Figure 6 is an enlarged fragmentary sectional plan view of mantle inserts, the mantle shell and strippers being omitted.

Figure 7 is an enlarged sectional view through the stripper assembly.

The machine to which the invention herein applies is suitable for use as an expanding machine, or can be used as a combined belling, expanding and/or testing machine as described in assignee's copending application, Serial No. 178,812, filed August 11, 1950, now Patent No. 2,667,136 issued January 26, 1954. The particular operations to be performed by the machine will govern the tools used on the sealing heads for sealing and/or operating upon the pipe ends.

In general, the machine includes a main frame arrangement having longitudinallly extending tie bars or frame members 20, 21 suitably supported near the ends of the machine. Columns or supports 22 can have cross channels 23 for the purpose of carrying the superstructure or truss arrangement 24. The superstructure 24 supports the various hydraulic motors and assists in supporting the upper longitudinal tie rod 20 through rods 20A. Upper tie rod 20 and lower tie rod 21 may have apertures 25 along the length thereof for receiving suitable locking pins 26 on movable carriage 27. Movable housing carriage 27 rests on rails 28 extending along the machine a sufficient distance to permit the desired adjustment of movable end or housing carriage 27. The carriage can have mounted thereon a sealing head 27A movable by hydraulic means. The stationary housing 81 may have a suitable hydraulic or other means thereon for moving sealing head 81A. When the pipe is located in alignment with the heads, the hydraulic motors carrying the sealing heads can be activated so as to cause the heads to move into engagement with the pipe. After the mantles have been closed, fluid pressure can be introduced into the interior of the pipe by suitable filling valves on head 81.

Loading and unloading

Assuming that the mantles are in open position (Fig. 4), incoming pipe can be fed to rack 29 (Fig. 4) where it can roll onto loading arm 30, loading arm 30 being pivoted on shaft 31 carried by swing bracket 50 which in turn is pivoted to the frame of the machine. Upper face of loading arm 30 is sloped so that the pipe thereon will roll onto the pipe supports 32 which are mounted on connecting rods 33 (Fig. 5). Supports 32 can have arcuately shaped segments 32A thereon. Connecting rods 33 are in turn operated by support hydraulic motors 33A (Figs. 3 and 4). Pipe supports 32 project through apertures 34, 35 and 36 (Fig. 5) in the mantle locks 37, mantles 38 and mantle inserts 39, these parts being described in detail hereafter. The supports 32 are suitably located along the machine, for example, there being one for every other mantle assembly, although they may be provided for each mantle assembly, if desired. The supports 32 are operated so as to properly center the pipe relative to the sealing heads at either end of the machine.

The loading arms not in use, when pipes shorter than the maximum length which can be handled by the machine are involved, can be raised to the dot-dash line positions 40 (Fig. 4) as will be explained hereafter.

Upon completion of a testing operation and the return of the mantles to the position illustrated in Figure 4, from the closed position of Fig. 3, ejectors 41 (Fig. 5), which are normally in a lowered position, may be raised by their hydraulic motors 42 (omitted from Figs. 3 and 4 for clarity). Raising of the ejectors 41 will lift the pipe off supports 32 and cause it to move onto unloading arms 43 (Fig. 4) which are sloped downwardly toward the right when in their lowered position of Fig. 4. For example, the operating surface of the ejector 41 may be inclined as are arms 30, 31. The pipe then will roll along the unloading arms to unloading rack 44 where it can be transferred as desired.

The loading and unloading arms are generally similar in this arrangement and the same general description applies to both. Unloading arm 43 is pivoted on shaft 45 to the bracket 50 and has slidably mounted thereon an auxiliary arm or member 46, said auxiliary arm being connected by an adjustable member or turnbuckle 47 to unloading arm lever 48. The lever 48 is pivotally mounted at 49 to bracket 50. Bracket 50 also is pivotally mounted at 45 to the frame and can be swung to the dot-dash line position 50A (Fig. 4), the motor 50B being used for this purpose. Stop bracket 45A limits downward movement of lever 48 on its pivot 49. The bracket 45A also carries lever 48 with bracket 50 as motor 50B is operated.

Mantles

The mantles are in an open position in Figure 4. Mantle halves 51, 52 are symmetrical and have mantle swing brackets 53 (Figs. 3 and 4) connected thereto, brackets 53 being pivotally mounted at 55 to the frame of the machine. Mantle lifting hydraulic motors 56 are swingably mounted at 57 to the frame of the machine, connecting rods 58 being pivotally connected at 59 to brackets 53.

When a pipe is in position between the sealing heads and is in readiness for the mantles to be closed, hydraulic motors 56 are energized to raise the mantles from the positions illustrated in Figure 4 to the closed position of Figure 3. As this occurs, suitable cams 60 on the mantles will contact levers 48 which will move upwardly until they strike their respective loading arms 30 or unloading arms 43 as the case might be. The levers and arms then will move upwardly as a unit until the mantles are closed as is seen in Figure 3. As the levers 48 first move upwardly, they will withdraw the slidable auxiliary arm 46 relative to the center of the machine. The auxiliary slidable arms 46 can be adjusted by means of turnbuckles 47 so that they have the correct location in relation to the particular pipe in supports 32.

Thus, with a small diameter pipe, auxiliary arm 46 can be adjusted so that it approaches quite close to the support 32. A support 32 can be used to suit the particular pipe being handled. As mentioned, the loading arms opposite unused mantles can be swung upwardly to the dot-dash lines 40, indicated in Figure 4, by means of motors 50B. Also, the auxiliary arm when retracted relative to its main arm permits the arms to be swung upwardly with less clearance because of the shortened length of the assembly. When mantles are in their lowered position, they can rest upon suitable blocks or stops 61.

Mantle locks

Assuming that the mantles have been swung upwardly to their closed position (Figure 3), the mantle locks next are brought into locking position relative to their mantles. Upper mantle locks 62 are raisable and lowerable by hydraulic motor means 63 connected thereto. Motor means 63 can be connected by rods 64 to the upper mantle locks 62. Guide means 65 are reciprocable in apertures in frame member 20. The operating motors for the upper mantle locks can be carried by superstructure 24.

Lower mantle locks 37 are operable through rods 68A and guides 69A by lower mantle lock hydraulic motors 67 carried on the frame of the machine. Pins 63, 69 (Fig. 5) extend inwardly from the upper and lower mantle lock guides 65 and 69A and engage apertures in the mantles 38 assisting in holding the mantles longitudinally relative to the machine frame.

The mantle halves may have shoulders 70 engageable by the vertical surfaces 71 of the channels of the mantle locks. The effective holding force of the mantle lock on its mantle assembly is directed substantially tangential to the exterior circumference of the mantle halves. There is a lock for both the upper and lower juxtapositioned longitudinally extending edges of the mantle assemblies. Such an arrangement eliminates to a large extent the unbalanced forces so that the mantle halves and supporting structure can be made lighter than otherwise possible. It is to be understood that the force does not have to be exactly tangential to the exterior circumference but can be in this general vicinity. For example, it may be between the interior bore of the mantle assembly and the outer part of the shoulder 70. As one example, the force may be directed tangential to the mean diameter of the mantle housing.

Ejectors

Upon completion of the expanding operation, clamps 72 extending through suitable apertures in the upper mantles, and opposite supports 32, are caused to move downwardly and to contact the pipe. Hydraulic motors 73 are connected to the clamps 72 for the purpose of moving them downwardly and holding the pipe between a support 32 and its clamp 72. Thereafter, the mantle locks can be retracted and then the mantles lowered to their open position as seen in Figure 4. As the mantles are opened, the active loading and unloading arms involved will ride along the cams 60 integral with the mantles until they again take the position illustrated in Figure 4.

Testing

If desired to test the pipe, the testing pressure can be applied to the pipe held on said supports and clamps so as to determine its mechanical strength and leakage. Thereafter, the clamps may be raised and the ejectors operated so as to eject the completed pipe on to its unloading arm where it can be rolled to the unloading platform 44.

Strippers and inserts

It is desirable to hold the pipe from longitudinal movement as the sealing heads are stripped therefrom. Each of the mantle halves has a mantle insert 39 (Figs. 5, 6, and 7) therein, said inserts having suitable apertures to receive the various supports, ejectors, and clamp elements. The inserts can be made of the proper curvature so as to obtain the correct interior diameter of the closed mantle assembly for the pipe involved.

The strippers can be mounted in the grooved slots 75 in each of the inserts. Preferably, the strippers are divided into eight segments. Undercuts 75A (Fig. 7) in grooves 75 will assist in holding the segments in the inserts.

Stripper segment 76 (Figs. 6, 7) may have apertures 77 therein for receiving springs 78, springs 78 being held in place by screw-plugs 79 screw-threadedly engaged with the mantle insert. Said springs serve to urge the strippers inwardly relative to the center line of the closed mantle assemblies.

A pipe end may be moved to the right (Fig. 6, Fig. 7) over the strippers which will cause them to be pressed inwardly relative to a mantle half if the pipe has a sufficiently large diameter at the time to contact the strippers. As the pipe expands against the strippers, the strippers will move outwardly and into the grooves. The stripper in the outermost mantle assembly will not be contacted by the pipe so that it will remain expanded toward the center of the machine. Thus, it will have surface 76A against which the pipe end will abut as it tends to slide longitudinally toward the left in Fig. 7. This will hold the pipe and permit the sealing head to be stripped therefrom.

As previously mentioned, the machine can be used for various operations or combinations thereof. For example, pipe can be placed between the sealing heads, the mantles closed, and then the interior of the pipe subjected to hydraulic pressure to expand the same. In addition, the ends of the pipe can be belled out before hydraulic pressure is exerted on the interior of the pipe. Also, it is possible to subject the pipe to internal hydraulic pressure after expanding the same for testing purposes. The mantle assemblies can be controlled automatically or by manual means so that the desired ones can be used. All of the mantle assemblies to be used for a particular pipe can be closed at the same time. It is to be understood that various details of construction can be changed without departing from the spirit of the invention except as defined in the appended claims.

What is claimed is:

1. In a machine for hydraulically expanding pipe or the like, the combination including frame means, pipe support means mounted on said frame means for supporting pipe adjacent the center line of the machine, mantle assemblies including two halves pivotally mounted on pivot means on said frame means at the centerline thereof and swingable from open position in a relatively horizontal open position to a closed position with the longitudinal juxtapositioned edges of said mantle halves when closed being in a substantially vertical plane, said mantle halves in closed position enveloping pipe held on said support means, means connected to said mantle halves for closing and opening the same, pipe handling loading and unloading arm means pivotally mounted on said frame at opposite sides of said center line, each of said arm means having end portions extending over said mantle halves when the halves are open, said end portions of said arm means then being adjacent said pipe support means for guiding pipe to and from said support means, said loading arm means being sloped toward said support means and said unloading arm means being sloped downwardly away from said support means, and cam means on said mantle halves for contacting said arm means as said mantle means are swung to move said arm means swingably upward to inactive position as the mantle halves are swung to closed position, said arm means returning to position over said halves as the halves are opened.

2. In a machine, the combination including frame means, mantle means having swingable mantle halves adapted to be moved from a relatively horizontal open position with the halves separated to a vertical closed position with the halves together for enveloping pipe to be operated upon in said machine, the juxtapositioned edges of the halves when closed being approximately in a vertical plane, a main pivoted pipe loading arm positioned over one of said mantle halves when the halves are in open position and in the path of movement of the half to closed position, the pivot of said arm being spaced from the mantle means and mounted on said frame means spaced normal to and laterally of said vertical plane, a lever pivoted for relative movement to said main arm and having crank-arm means connected thereto, an auxiliary slidable arm mounted on said main arm and reciprocably extendable beyond the end thereof for guiding pipe toward the center of the machine, means operated by movement of said mantle half over which said main arm is positioned as said half is swung to vertical position moving said lever and main arm toward an inactive position out of the way of said one half as the half is closed, and means for connecting said auxiliary arm and said crank-arm means to retract said auxiliary arm relative to the main arm as said lever is pivoted relative to said main arm by said means operated by movement of said mantle half moving said lever and main arm toward inactive position.

3. In a hydraulic machine, the combination including frame means, sealing heads for pipe ends, pipe support means for holding pipe in aligned relationship with said sealing heads, mantle means having swingable mantle halves adapted to be moved from a relatively horizontal open position with the halves separated to a vertical closed position for enveloping said pipe, the juxtapositioned edges of the halves when closed being approximately in a vertical plane, a main pivoted pipe loading arm pivoted on said frame means and positioned over one of said mantle halves when said mantle halves are in open position and in the path of movement of the half to closed position, the pivot of said arm being spaced from said mantle means and mounted on said frame means, a lever pivoted for relative movement to said main arm, an auxiliary slidable arm mounted on said main arm and extendable beyond the end thereof for guiding pipe toward the center of the machine and said pipe support means, cam means on the exterior of said one half in the path of movement of said lever for engaging the lever as the half is swung to vertical position, and means for connecting said auxiliary arm and lever to retract said auxiliary arm relative to the main arm as said lever is pivoted relative to said main arm by said cam means.

References Cited in the file of this patent

UNITED STATES PATENTS

| | | |
|---|---|---|
| 1,013,046 | Murphy | Dec. 26, 1911 |
| 1,245,059 | Strand | Oct. 30, 1917 |
| 1,533,115 | Hulbert | Apr. 14, 1925 |
| 1,879,009 | Anthony | Sept. 27, 1932 |
| 1,973,622 | Hand | Sept. 11, 1934 |
| 2,298,132 | Johnson | Oct. 6, 1942 |
| 2,344,779 | Kolderman et al. | Mar. 21, 1944 |
| 2,407,855 | Stephens | Sept. 17, 1946 |
| 2,460,820 | Hagopian | Feb. 8, 1949 |